(12) United States Patent  
Ishigami et al.

(10) Patent No.: US 10,863,116 B2  
(45) Date of Patent: Dec. 8, 2020

(54) SOLID-STATE IMAGE CAPTURE DEVICE, IMAGE CAPTURE SYSTEM, AND OBJECT IDENTIFICATION SYSTEM

(71) Applicant: nanolux co. ltd., Tsukuba (JP)

(72) Inventors: Koichiro Ishigami, Tsukuba (JP); Hirofumi Sumi, Tsukuba (JP); Motoshi Sobue, Tsukuba (JP)

(73) Assignee: nanolux co. ltd., Tsukuba (JP)

( * ) Notice: Subject to any disclaimer, the term of this patent is extended or adjusted under 35 U.S.C. 154(b) by 0 days.

(21) Appl. No.: 16/606,227

(22) PCT Filed: May 9, 2018

(86) PCT No.: PCT/JP2018/017925  
§ 371 (c)(1),  
(2) Date: Oct. 18, 2019

(87) PCT Pub. No.: WO2018/207817  
PCT Pub. Date: Nov. 15, 2018

(65) Prior Publication Data  
US 2020/0128197 A1    Apr. 23, 2020

(30) Foreign Application Priority Data

May 11, 2017    (JP) ................................. 2017-095099

(51) Int. Cl.  
*H04N 5/33* (2006.01)  
*H04N 9/04* (2006.01)

(52) U.S. Cl.  
CPC ............ *H04N 5/332* (2013.01); *H04N 9/045* (2013.01)

(58) Field of Classification Search  
None  
See application file for complete search history.

(56) References Cited

U.S. PATENT DOCUMENTS 6,603,865 B1 *   8/2003   Yagi .......................... G06T 7/70  
                                                                    382/103  
8,854,472 B1    10/2014   Nagamune  
(Continued)

FOREIGN PATENT DOCUMENTS

JP    2008-166926 A    7/2008  
JP    2008-244246 A    10/2008  
(Continued)

OTHER PUBLICATIONS

International Search Report in International Application No. PCT/JP2018/017925, dated Jun. 19, 2018, 3pp.

*Primary Examiner* — Fernando Alcon  
(74) *Attorney, Agent, or Firm* — Hauptman Ham, LLP

(57) ABSTRACT

A solid-state image capture device and an image capture system capable of photographing a color image with high sensitivity in a wide illuminance environment from normal illuminance to darkness. A solid-state image capture device is provided with a first detection portion in which a first visible light pixel receiving first visible light and a first near-infrared pixel receiving first near-infrared light are provided adjacent to each other, a second detection portion in which a second visible light pixel receiving second visible light different in wavelength from the first visible light and a second near-infrared pixel receiving second near-infrared light are provided adjacent to each other, and a third detection portion in which a third visible light pixel receiving third visible light different in wavelength from the first visible light and the second visible light and a third near-infrared pixel receiving third near-infrared light are provided adjacent to each other.

19 Claims, 15 Drawing Sheets

(56) References Cited

U.S. PATENT DOCUMENTS

| | | | |
|---|---|---|---|
| 10,090,374 B2* | 10/2018 | Hwang | H01L 27/3223 |
| 2009/0009621 A1 | 1/2009 | Yamaguchi et al. | |
| 2011/0063451 A1* | 3/2011 | Kannon | H04N 9/045 |
| | | | 348/164 |
| 2012/0050535 A1* | 3/2012 | Densham | G01S 3/7864 |
| | | | 348/159 |
| 2012/0062746 A1* | 3/2012 | Otsuka | H04N 5/2353 |
| | | | 348/148 |
| 2012/0075514 A1* | 3/2012 | Liu | H04N 9/045 |
| | | | 348/308 |
| 2015/0237321 A1* | 8/2015 | Sekiguchi | H04N 5/23245 |
| | | | 348/164 |
| 2016/0255286 A1* | 9/2016 | Tsukada | G02B 5/201 |
| | | | 348/162 |
| 2017/0041560 A1 | 2/2017 | Gotoh et al. | |
| 2017/0330053 A1* | 11/2017 | Park | G06K 9/4661 |
| 2019/0052855 A1* | 2/2019 | Nair | G02B 5/208 |
| 2019/0236917 A1* | 8/2019 | Billington | H04W 4/20 |

FOREIGN PATENT DOCUMENTS

| | | |
|---|---|---|
| JP | 2009-232351 A | 10/2009 |
| JP | 2011-50049 A | 3/2011 |
| JP | 2015-226299 A | 12/2015 |
| JP | 2016-174028 A | 9/2016 |
| WO | 2007/086155 A1 | 8/2007 |
| WO | 2011/013765 A1 | 2/2011 |
| WO | 2015/059897 A1 | 4/2015 |
| WO | 2015/111197 A1 | 7/2015 |
| WO | 2015/159651 A1 | 10/2015 |
| WO | 2016/158128 A1 | 10/2016 |

\* cited by examiner

FIG. 15

| R | G | R+IRR | G |
|---|---|---|---|
| G+IRG | B | G+IRG | B+IRB |
| R+IRR | G | R | G |
| G+IRG | B+IRB | G+IRG | B |

FIG. 16

| R | G | B | G |
|---|---|---|---|
| G+IRG | R+IRR | G+IRG | B+IRB |
| R | G | B | G |
| G+IRG | R+IRR | G+IRG | B+IRB |

SOLID-STATE IMAGE CAPTURE DEVICE, IMAGE CAPTURE SYSTEM, AND OBJECT IDENTIFICATION SYSTEM

RELATED APPLICATIONS

The present application is a National Phase of International Application Number PCT/JP2018/017925, filed May 9, 2018, which claims priority to Japanese Application Number 2017-095099, filed May 11, 2017.

Technical Field

The present invention relates to a solid-state image capture device and an image capture system for color image photographing. More specifically, the present invention relates to a technique of detecting near-infrared light of a specific wavelength, and then generating a color image.

Background Art

An image capture device has been proposed which detects infrared rays reflected on a subject or infrared rays emitted from a subject, and then forming a color image of the subject (see Patent Document 1). The image capture device described in Patent Document 1 generates a color image from near-infrared light utilizing the fact that the subject spectral reflectance characteristic similar to that in a visible wavelength region is observed also in a near-infrared wavelength region. Specifically, light in a near-infrared region having a high correlation with a color when the same subject is viewed under visible light is detected, and then a pseudo display color is generated from the detection information. When this technique is utilized, a color image can be captured also in an extremely low illuminance environment or darkness.

Meanwhile, in order to realize the technique described in Patent Document 1, it is necessary to detect three kinds of near-infrared light (NIR-R, -G, -B) corresponding to red light (R), green light (G), and blue light (B), respectively. Conventionally, as a solid-state image capture element capable of detecting both light in a visible region and light in a near-infrared region, one in which pixels for detecting red light (R), green light (G), or blue light (B) and pixels for detecting near-infrared light (NIR) are arranged on the same substrate has been proposed, for example, (e.g., see Patent Documents 2 to 4).

Moreover, a photodetection device individually detecting red light (R), green light (G), or blue light (B) and three kinds of near-infrared light (NIR-R, -G, -B) corresponding to the light, respectively, by the same pixels has also been proposed (see Patent Documents 5 and 6). For example, in the photodetection device described in Patent Document 5, pixels each provided with an optical filter transmitting only red light (R) and a near-infrared light (NIR-R) corresponding thereto, an optical filter transmitting only green light (G) and a near-infrared light (NIR-G) corresponding thereto, and an optical filter transmitting only blue light (B) and a near-infrared light (NIR-B) corresponding thereto are periodically disposed.

Citation List

Patent Document
[Patent Document 1] WO No. 2011-013765
[Patent Document 2] WO No. 2007/086155
[Patent Document 3] JP-A No. 2008-244246
[Patent Document 4] JP-A No. 2016-174028
[Patent Document 5] WO No. 2015/159651
[Patent Document 6] WO No. 2016/158128

SUMMARY OF THE INVENTION

Technical Problem

However, the conventional solid-state image capture elements described above have problems described below. First, near-infrared light detection pixels in the solid-state image capture elements described in Patent Documents 2 to 4 are configured so that an infrared filter is not provided and only an RGB color filter is provided, whereby the incidence of visible light is shielded. Therefore, these solid-state image capture elements cannot selectively detect near-infrared light of a specific wavelength. More specifically, the solid-state image capture elements described in Patent Documents 2 to 4 are difficult to capture color images in an extremely low illuminance environment or darkness.

Meanwhile, the photodetection devices described in Patent Documents 5 and 6 assume the application to the technique described in Patent Document 1 but it is difficult to design an optical filter transmitting only a specific wavelength in a visible region and a specific wavelength in a near-infrared region and reflects the other light. Moreover, when such an optical filter is structured so that a high refractive layer and a low refractive layer are laminated as described in Patent Document 5, high accuracy film thickness control is required and further a manufacturing process is also complicated. Therefore, a further improvement has been demanded in the photodetection devices described in Patent Documents 5 and 6 from the viewpoint of a manufacturing cost or a manufacturing process.

Thus, it is an object of the present invention to provide a solid-state image capture device and an image capture system capable of capturing a color image with high sensitivity in a wide illuminance environment from normal illuminance to darkness (0 lux).

Solution to Problem

A solid-state image capture device according to the present invention has a first detection portion in which a first visible light pixel receiving first visible light and a first near-infrared pixel receiving first near-infrared light are provided adjacent to each other, a second detection portion in which a second visible light pixel receiving second visible light different in wavelength from the first visible light and a second near-infrared pixel receiving second near-infrared light are provided adjacent to each other, and a third detection portion in which a third visible light pixel receiving third visible light different in wavelength from the first visible light and the second visible light and a third near-infrared pixel receiving third near-infrared light are provided adjacent to each other.

In the solid-state image capture device, the first near-infrared pixel may also receive the first visible light, the second near-infrared pixel may also receive the second visible light, and the third near-infrared pixel may also receive the third visible light.

For example, the first visible light, the second visible light, and the third visible light are red light, green light, and blue light, respectively.

In the solid-state image capture device of the present invention, the first near-infrared light can be light in a near-infrared region in correlation with the first visible light, the second near-infrared light can be light in the near-infrared region in correlation with the second visible light, and the third near-infrared light can be light in the near-infrared region in correlation with the third visible light.

Alternatively, the solid-state image capture device of the present invention can receive two kinds or three kinds of near-infrared light of different wavelengths by the first to third near-infrared pixels. More specifically, two kinds among the first near-infrared light, the second near-infrared light, and the third near-infrared light may be light of the same wavelength.

Alternatively, in the solid-state image capture device of the present invention, the second near-infrared pixel and/or the third near-infrared pixel can receive light in bands including two or more among light in a near-infrared region in correlation with the first visible light, light in the near-infrared region in correlation with the second visible light, and light in the near-infrared region in correlation with the third visible light.

In the solid-state image capture device of the present invention, the first detection portion, the second detection portion, and the third detection portion may be provided on the same element.

Alternatively, the solid-state image capture device of the present invention can be configured so that the first to third detection portions are provided in elements different from each other and a spectral element spectrally dividing light from a subject and emitting the spectrally divided light to the first to third detection portions is provided.

Furthermore, the solid-state image capture device of the present invention may be provided with an image generation portion generating a color image using signals acquired by the first to third detection portions.

The image generation portion composites visible light components detected in the first to third visible light pixels and near-infrared light components detected in the first to third near-infrared pixels at an arbitrary ratio to generate a color image, for example.

An image capture system according to the present invention is provided with the solid-state image capture device described above and a light irradiation device irradiating a subject with near-infrared light.

In the image capture system, the solid-state image capture device may be provided with an illumination light control portion controlling the light quantity of the near-infrared light emitted from the light irradiation device based on detection results of visible light and near-infrared light in each detection portion.

An object identification system according to the present invention has a light source attached to a target object and emitting near-infrared light of a specific wavelength, a photodetector detecting the near-infrared light emitted from the light source, and a data processing device provided with an object determination portion determining whether the target object is present in a detection region from a detection result in the photodetector and an object identification portion identifying the target object from wavelength information of the near-infrared light detected with the photodetector.

In that case, the solid-state image capture device described above may be used as the photodetector and the object identification portion of the data processing device may acquire color information given to the target object from the wavelength of the near-infrared light detected with the photodetector and may identify the target object from the color information.

The object identification system may further have an image capture device capturing a visible light image in the target object, in which the data processing device may be provided with an image compositing portion adding the color information of the target object acquired in the object identification portion or arbitrary information correlated with the color information to the visible light image captured with the image capture device.

The object identification system of the present invention may have a display device displaying a processing result in the data processing device.

Advantageous Effects of Invention

The present invention can achieve high sensitivity photographing in a wide illuminance environment from normal illuminance to darkness (0 lux) and can provide a color image also under low illuminance.

BRIEF DESCRIPTION OF DRAWINGS

FIG. 15 is a view illustrating a pixel arrangement example of a solid-state image capture element according to a fifth embodiment of the present invention.

FIG. 16 is a view illustrating another pixel arrangement example of the solid-state image capture element according to the fifth embodiment of the present invention.

DESCRIPTION OF EMBODIMENTS

Hereinafter, aspects for carrying out the present invention are described in detail with reference to the attached drawings. The present invention is not limited to embodiments described below.

First Embodiment

Figure 1:
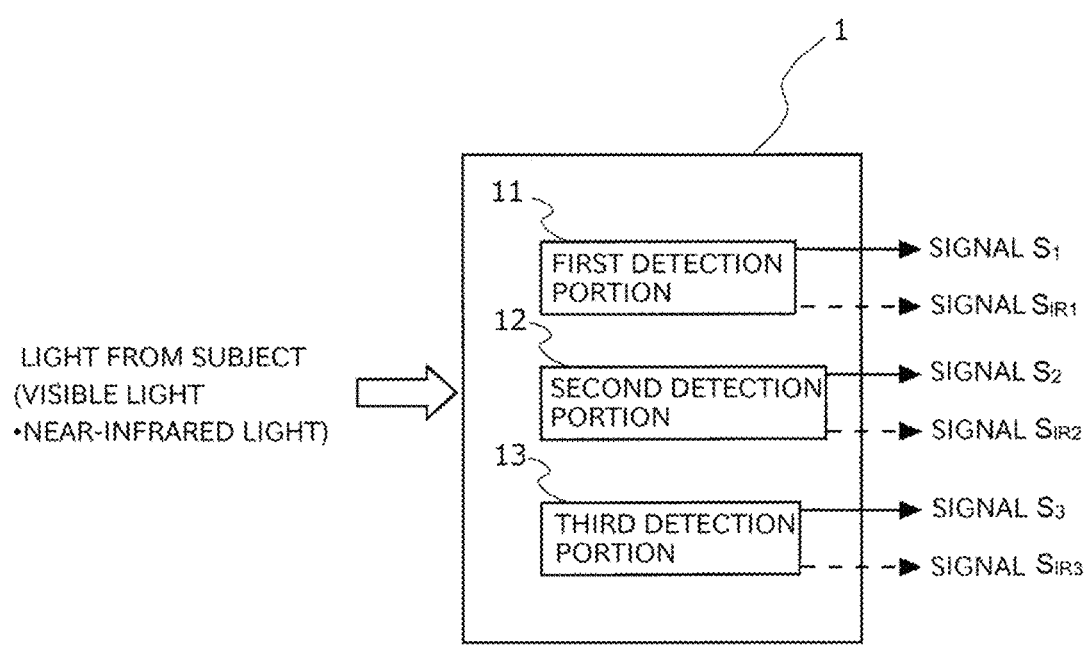
FIG. 1 is a conceptual diagram illustrating the basic configuration of a solid-state image capture device of a first embodiment of the present invention.

First, a solid-state image capture device according to a first embodiment of the present invention is described. The solid-state image capture device of this embodiment has three or more kinds of detection portions in which a pixel receiving visible light (visible light pixel) and a pixel receiving near-infrared light (near-infrared pixel) are provided adjacent to each other and which are different in the wavelength range of a detection target. FIG. 1 is a conceptual diagram illustrating the basic configuration of the solid-state image capture device of this embodiment.

As illustrated in FIG. 1, a solid-state image capture device 1 of this embodiment is provided with a first detection portion 11, a second detection portion 12, and a third detection portion 13 detecting light reflected on a subject or light emitted from a subject. The detection portions 11 to 13 detect visible light and near-infrared light of specific wavelengths and output signals $S_1$, $S_2$, and $S_3$ based on the visible light and signals $S_{IR1}$, $S_{IR2}$, and $S_{IR3}$ based on the near-infrared light, for example.

[Visible Light Pixel]

A first visible light pixel provided in the first detection portion 11, a second visible light pixel provided in the second detection portion 12, and a third visible light pixel provided in the third detection portion 13 individually receive visible light of wavelengths different from each other. For example, when the first visible light pixel receives red light R, the second visible light pixel receives green light G and the third visible light pixel receives blue light B.

In that case, each of the visible light pixels of the detection portions 11 to 13 may be configured to be provided with a red light filter reflecting and/or absorbing visible light other than the red light R, a green light filter reflecting and/or absorbing visible light other than the green light G, and a blue light filter reflecting and/or absorbing visible light other than the blue light B on a photoelectric conversion layer detecting incident light as an electric signal.

The photoelectric conversion layer is one in which a plurality of photoelectric conversion portions is formed on a substrate containing silicon or the like. The red light filter, the green light filter, and the blue light filter are individually formed on the corresponding photoelectric conversion portions. The structure of the photoelectric conversion layer is not particularly limited and a CCD (Charge Coupled Device) structure, a CMOS (Complementary Metal Oxide Semiconductor) structure, and the like can be adopted.

The transmission wavelengths of the color filters provided on the photoelectric conversion layer are not limited to the red light R, the green light G, and the blue light B described above and can be selected as appropriate according to the specification or the like of the solid-state image capture device. Moreover, materials forming the color filters are also not particularly limited and known materials are usable.

[Near-Infrared Pixel]

Meanwhile, a first near-infrared pixel provided in the first detection portion 11, a second near-infrared pixel provided in the second detection portion 12, and a third near-infrared pixel provided in the third detection portion 13 detect light of two or more kinds of wavelengths. More specifically, although the near-infrared pixels of the detection portions 11 to 13 may receive near-infrared light of wavelengths different from each other, the near-infrared pixels of the different detection portions may receive near-infrared light of the same wavelength.

When the detection portions receive near-infrared light of wavelengths different from each other, the first to third near-infrared pixels can receive light in a near-infrared region in correlation with visible light received by the first to third visible light pixels described above. For example, when the first to third visible light pixels receive the red light (R), the green light (G), and the blue light (B), respectively, the first to third near-infrared pixels receive near-infrared light in correlation with the RGB.

The near-infrared pixels of the detection portions 11 to 13 each can be configured to be provided with an optical filter selectively transmitting near-infrared light of a specific wavelength as in an interference filter or the like on the photoelectric conversion layer. When the first to third near-infrared pixels receive the near-infrared light in correlation with the RGB, a configuration may be acceptable in which a short pass filter in which the transmittance of near-infrared light of a wavelength longer than 800 nm is 50% or less is provided in the first near-infrared pixel, a bandpass filter having a central wavelength of 850 nm is provided in the second near-infrared pixel, and a long pass filter in which the transmittance of near-infrared light of a wavelength shorter than 890 nm is 50% or less is provided in the third near-infrared pixel, for example.

Moreover, for example, the first near-infrared pixel receives light in the near-infrared region in correlation with the visible light received by the first visible light pixel and the second near-infrared pixel and the third near-infrared pixel can also receive light in the near-infrared region in correlation with the visible light received by the third visible light pixel, the light in the near-infrared region in correlation with visible light received by the second visible light pixel, or wide band light including both the light.

Furthermore, the solid-state image capture device 1 of this embodiment may also be configured so that the first to third near-infrared pixels receive only near-infrared light but can also be configured so that the first to third near-infrared pixels receive visible light together with near-infrared light. Thus, color photographing by near-infrared light can be achieved while securing the sensitivity in photographing by visible light and not reducing an S/N (Signal/Noise) ratio.

Configuration Example

Figure 2A:
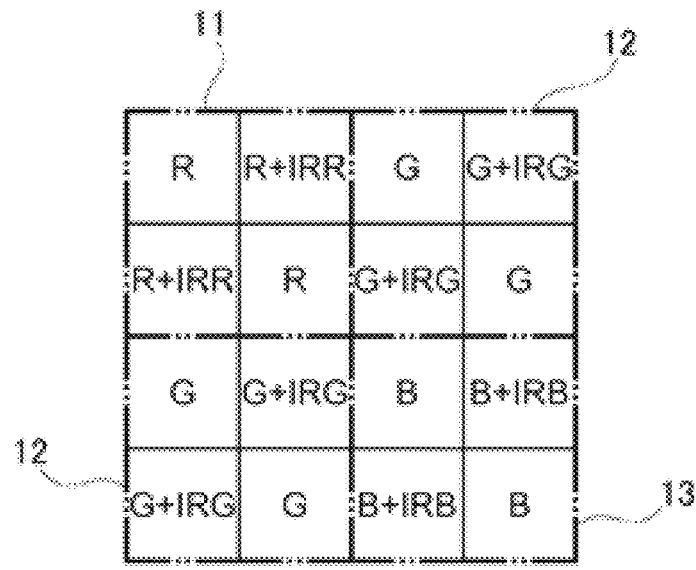
FIG. 2A is a view illustrating a pixel arrangement example of a solid-state image capture element provided with detection portions 11 to 13 and FIG. 2B is a view illustrating the spectrum characteristic of an optical filter provided on each pixel of FIG. 2A.
Figure 2B:
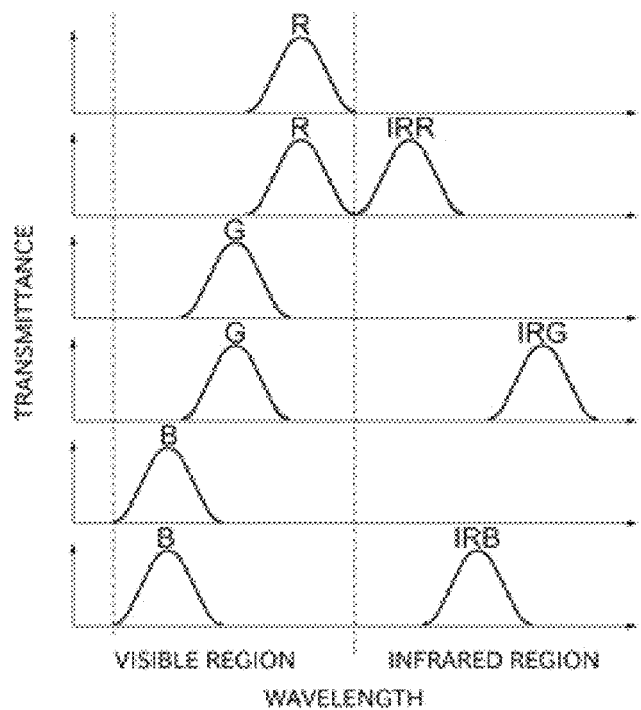
Figure 3A:
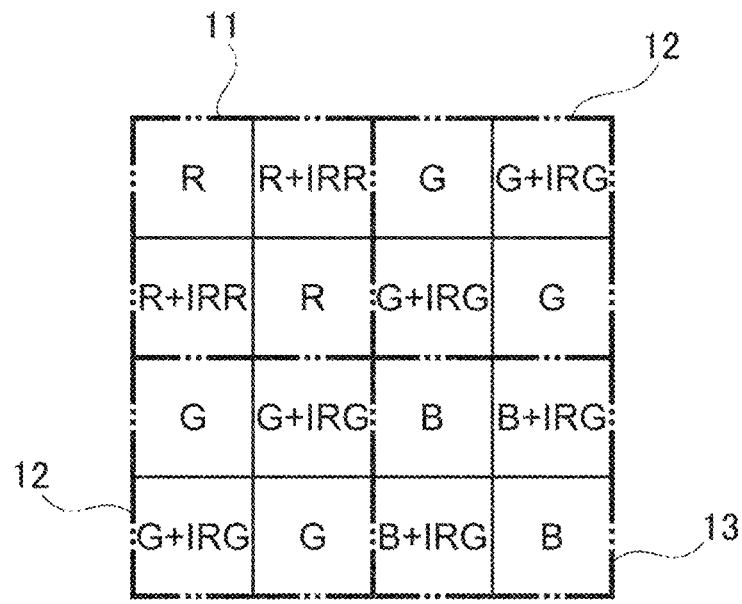
FIG. 3A is a view illustrating another pixel arrangement example of the solid-state image capture element provided with the detection portions 11 to 13 and FIG. 3B is a view illustrating the spectrum characteristic of an optical filter provided on each pixel of FIG. 3A.
Figure 3B:
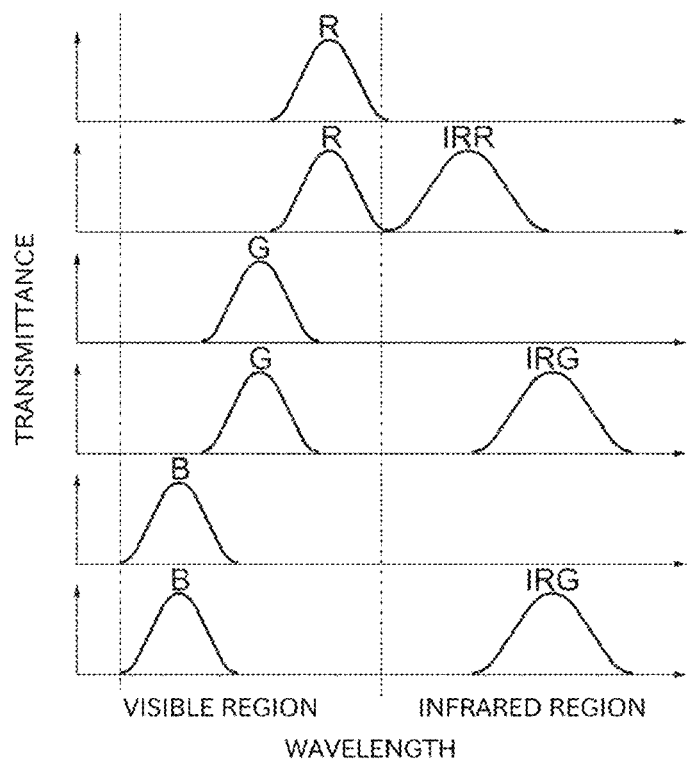
Figure 4A:
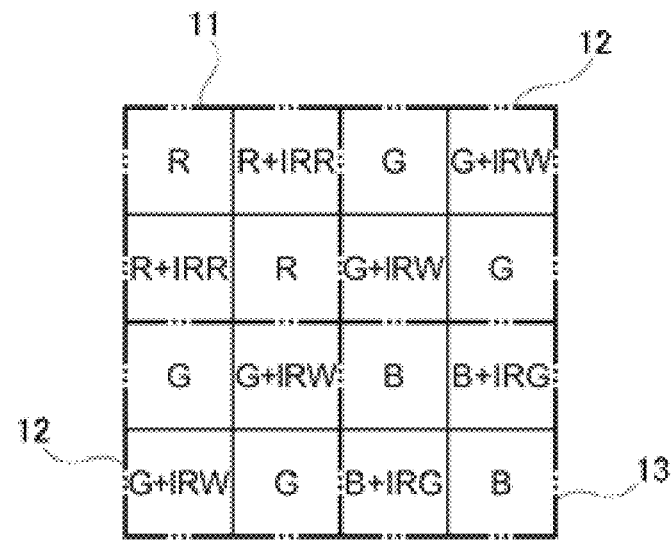
FIG. 4A is a view illustrating another pixel arrangement example of the solid-state image capture element provided with the detection portions 11 to 13 and FIG. 4B is a view illustrating the spectrum characteristic of an optical filter provided on each pixel of FIG. 4A.
Figure 4B:
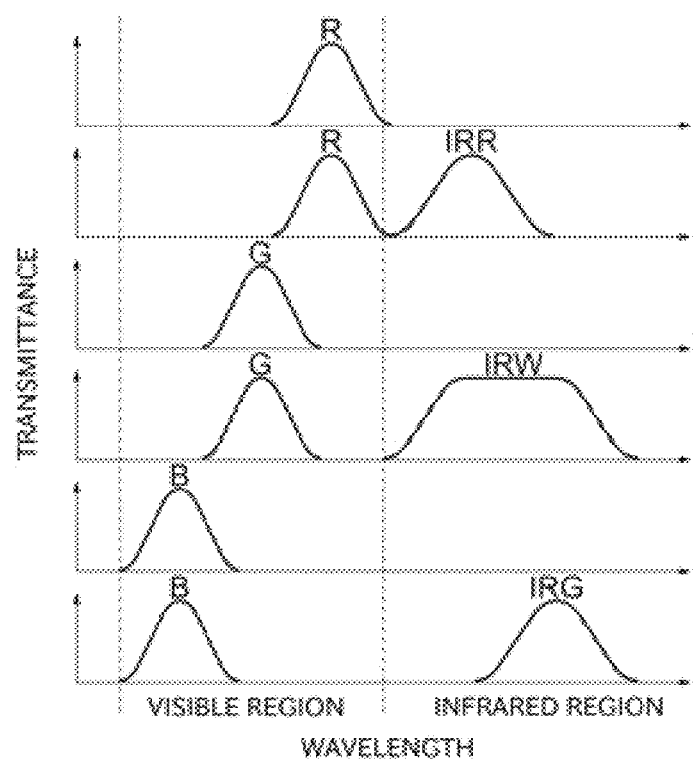
Figure 6:
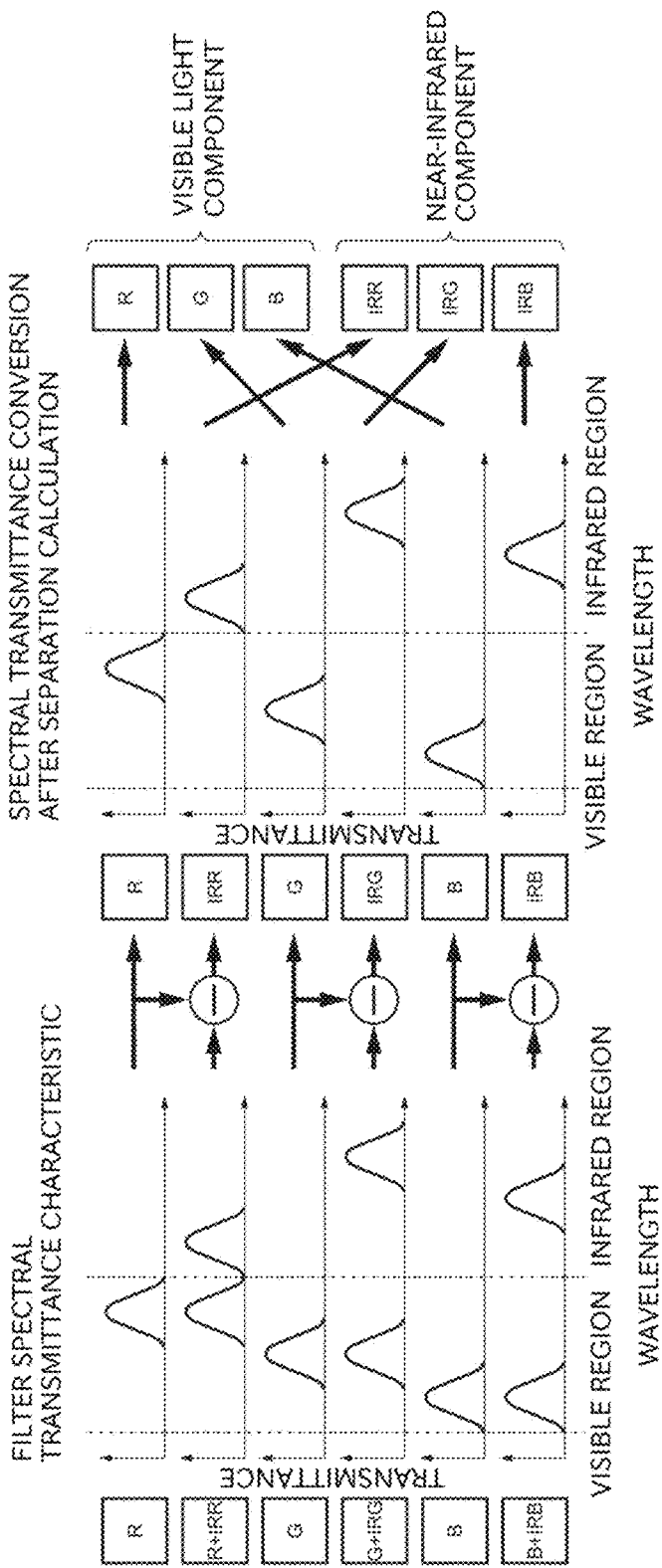
FIG. 6 is a view illustrating detection components obtained when the solid-state image capture element of the pixel arrangement illustrated in FIG. 2 is used.
Figure 7:
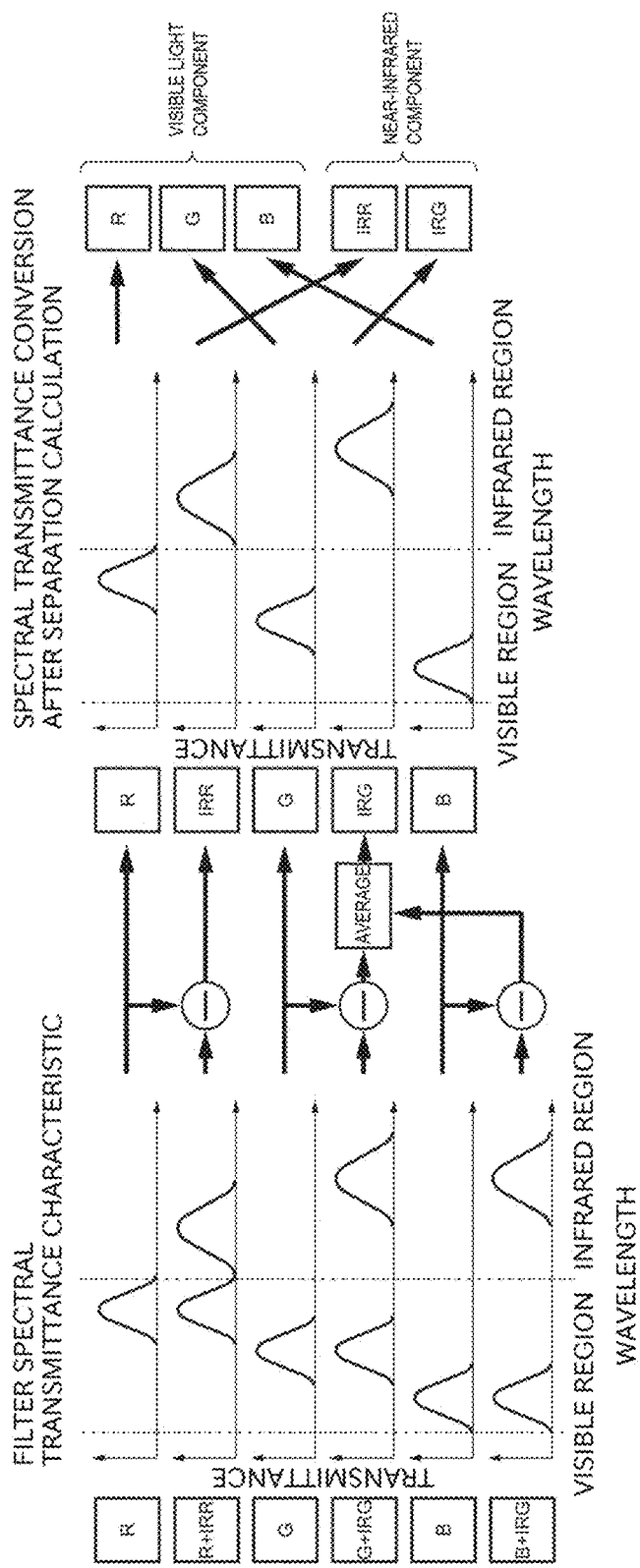
FIG. 7 is a view illustrating detection components obtained when the solid-state image capture element of the pixel arrangement illustrated in FIG. 3 is used.
Figure 8:
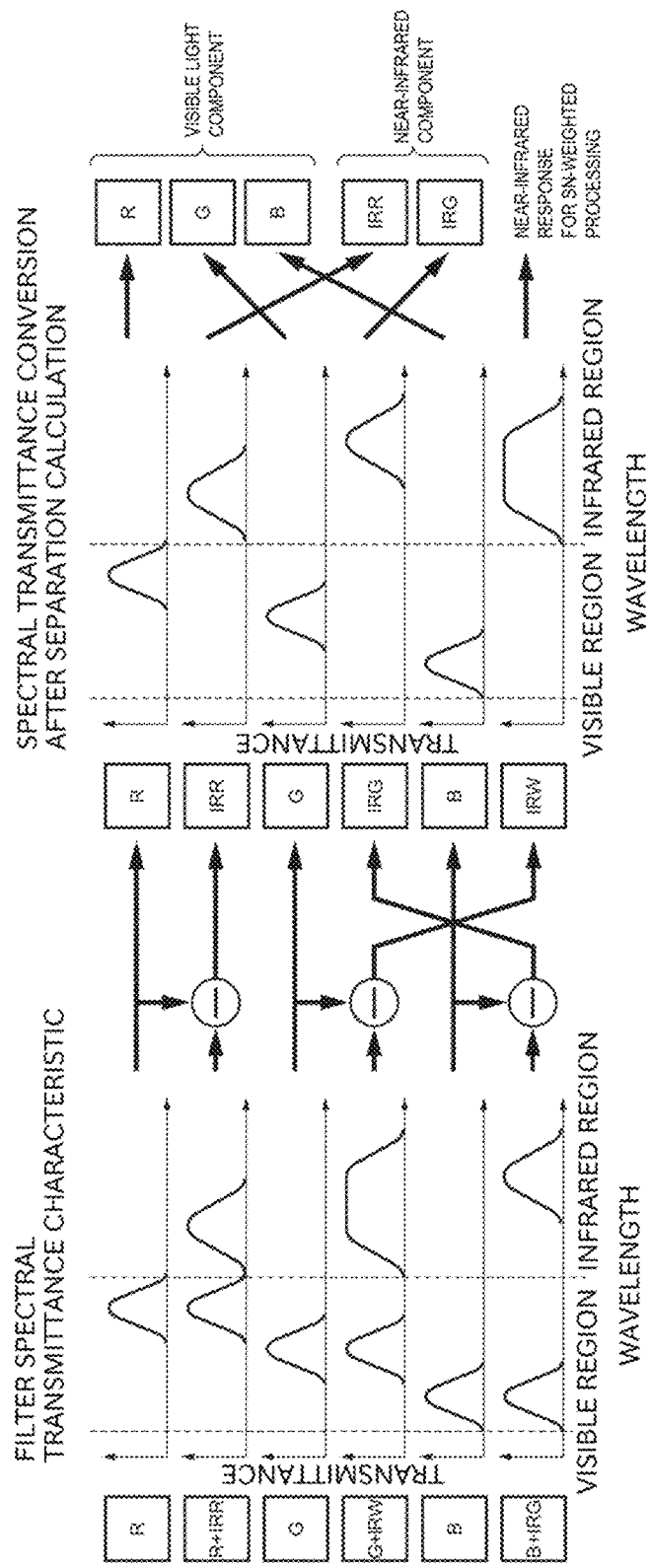
FIG. 8 is a view illustrating detection components obtained when the solid-state image capture element of the pixel arrangement illustrated in FIG. 4 is used.

In the solid-state image capture device 1 of this embodiment, the detection portions 11 to 13 can be formed on one solid-state image capture element. FIGS. 2A, 3A, and 4A are pixel arrangement examples of the solid-state image capture element provided with the detection portions 11 to 13. FIGS. 2B, 3B, and 4B are views illustrating the spectrum characteristic of the optical filter provided on each pixel. FIG. 6 to FIG. 8 are views illustrating detection components obtained when using the solid-state image capture elements of the pixel arrangements illustrated in FIG. 2 to FIG. 4, respectively.

When the three kinds of detection portions 11 to 13 are provided on the same element, the pixel arrangements having repeating units illustrated in FIGS. 2A, 3A, and 4A can be adopted, for example. In the solid-state image capture element of the pixel arrangement illustrated in FIG. 2A, the red light R and near-infrared light IRR in correlation with the red light are detected in the first detection portion 11 as illustrated in FIG. 2B. In the second detection portion 12, the green light G and near-infrared light IRG in correlation with the green light are detected. In the third detection portion 13, the blue light B and near-infrared light IRE in correlation with the blue light are detected.

Herein, the near-infrared light IRR is light of an arbitrary wavelength in the range of 700 to 830 nm, the near-infrared light IRG is light of an arbitrary wavelength in the range of 880 to 1200 nm, and the near-infrared light IRE is light of an arbitrary wavelength in the range of 830 to 880 nm, for example, and each light has a different wavelength.

In the case of this pixel arrangement, with respect to visible light, the red light R, the green light G, and the blue light B are directly detected in the visible light pixels. However, in the near-infrared pixels, both the visible light and the near-infrared light are detected. Therefore, the components detected in the visible light pixels are removed from the components detected in the near-infrared pixels, whereby the near-infrared light IRR, IRG, and IRE in correlation with the RGB can be extracted as illustrated in FIG. 6.

Thus, the pixel arrangement illustrated in FIG. 2A allows the detection of three wavelength components with respect to visible light and three wavelength components with respect to near-infrared light. Therefore, also in an ultra-low illuminance or darkness (0 lux), a color image excellent in color reproducibility is obtained. Moreover, the solid-state image capture element of this pixel arrangement performs the detection in a different pixel for each wavelength, and therefore the design of each pixel is easy and the film configuration can also be simplified. Therefore, the solid-state image capture element of this pixel arrangement can be more easily manufactured as compared with conventional products.

Meanwhile, FIG. 3A and FIG. 4A are examples of the pixel arrangements attaching importance to sensitivity. In the pixel arrangement illustrated in FIG. 3A, the red light R and the near-infrared light IRR in correlation with the red light are detected in the first detection portion 11 as illustrated in FIG. 3B. In the second detection portion 12, the green light G and the near-infrared light IRG in correlation with the green light are detected. In the third detection portion 13, the blue light B and the near-infrared light IRG in correlation with the green light are detected.

In the pixel arrangement illustrated in FIG. 4A, the red light R and the near-infrared light IRR in correlation with the red light are detected in the first detection portion 11 as illustrated in FIG. 4B. In the second detection portion 12, the green light G and light IRW in a wide band including from the green light G and the near-infrared light IRR in correlation with the red light to the near-infrared light IRG in correlation with the green light is detected. Furthermore, in the third detection portion 13, the blue light B and the near-infrared light IRG in correlation with the green light are detected.

In the solid-state image capture elements of the pixel arrangements illustrated in FIG. 3 and FIG. 4, only the near-infrared light IRR in correlation with the red light R and the near-infrared light IRG in correlation with the green light G are separated and extracted as the near-infrared components and the near-infrared light IRE in correlation with the blue light B is not detected as illustrated in FIG. 7 and FIG. 8. Thus, the selection range of the detection wavelength of each of the near-infrared pixels expands, and therefore the sensitivity of color photographing under a low illuminance can be increased.

Figure 5A:
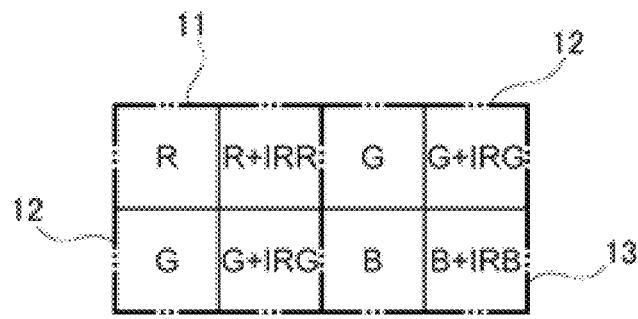
FIGS. 5A to 5C are views illustrating other pixel arrangement examples of the solid-state image capture element provided with the detection portions 11 to 13.
Figure 5B:
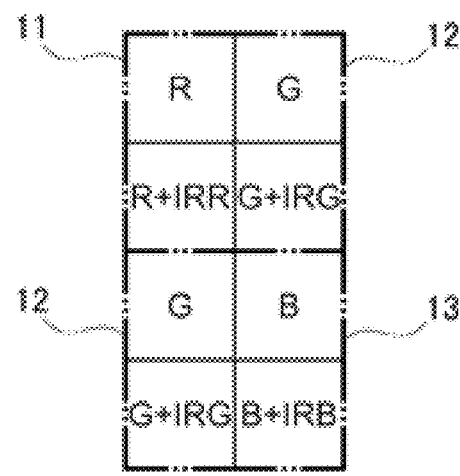
Figure 5C:
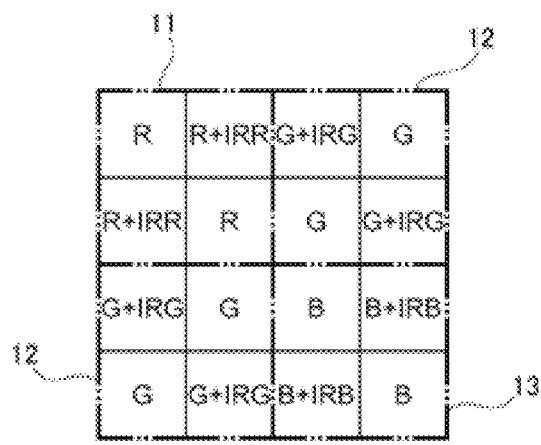

Although FIGS. 2 to 4 illustrate the examples in which four pixels configure one detection portion, the present invention is not limited thereto and the number of pixels configuring each detection portion is not limited insofar as the visible light pixels and the near-infrared pixels are disposed adjacent to each other. FIGS. 5A to 5C are views illustrating other pixel arrangement examples of the solid-state image capture element provided with the detection portions 11 to 13. Specifically, two pixels can also configure one detection portion as in the pixel arrangements having repeating units illustrated in FIG. 5A and FIG. 5B. In that case, the arrangement of the visible light pixel and the near-infrared pixel may be either vertical arrangement or horizontal arrangement.

Also when four pixels configure one detection portion, the visible light pixels and the near-infrared pixels may be disposed adjacent to each other in the detection portion. As illustrated in FIG. 5C, the visible light pixels and the near-infrared pixels may not be disposed adjacent to each other between the pixels of other detection portions adjacent to each other among the repeating units. More specifically, in the solid-state image capture element of this embodiment, the visible light pixel receiving the red light R provided in the detection portion 11 and the visible light pixel receiving the green light G provided in the detection portion 12 may be disposed adjacent to each other as in the pixel arrangement illustrated in FIG. 5C.

Although FIGS. 1 to 4 illustrate the examples in which the three detection portions 11 to 13 are provided, the present invention is not limited thereto and four or more kinds of detection portions in which the visible light pixels and the near-infrared pixels are disposed adjacent to each other and which are different in the detection wavelength at least in a visible light region from each other can also be provided.

The solid-state image capture device of this embodiment has the three or more kinds of detection portions in which the visible light pixel and the near-infrared pixel are disposed adjacent to each other and detect visible light of three or more wavelengths and near-infrared light of two or more wavelengths, and therefore can generate a color image using the visible light or the near-infrared light detected in each detection portion or both of them. Therefore, the use of the solid-state image capture device of this embodiment enables the capture of a color image in a wide illuminance environment from normal illuminance to darkness (0 lux). Particularly in an environment where the light quantity of visible light remarkably decreases as in the night when there is no artificial lighting, a color image is generated using both the visible light and the near-infrared light, whereby a color image having less noise and excellent color reproducibility is obtained.

The solid-state image capture device of this embodiment detects near-infrared light also in normal illuminance and can perform correction using a detection signal thereof, and therefore an infrared cut filter is not required to be separately provided. Similarly, also when a color image is generated utilizing a signal by the near-infrared pixel, color adjustment can be performed by performing the correction using visible light components, and therefore a visible light cut filter (infrared pass) is also not required to be separately provided. Thus, the device configuration can be simplified.

First Modification of First Embodiment

Next, a solid-state image capture device according to a first modification of the first embodiment of the present invention is described. Although the solid-state image capture device of the first embodiment described above adopts the configuration in which the three detection portions are formed on the same pixel, the present invention is not limited thereto and the detection portions may be formed in solid-state image capture elements different from each other.

Figure 9:
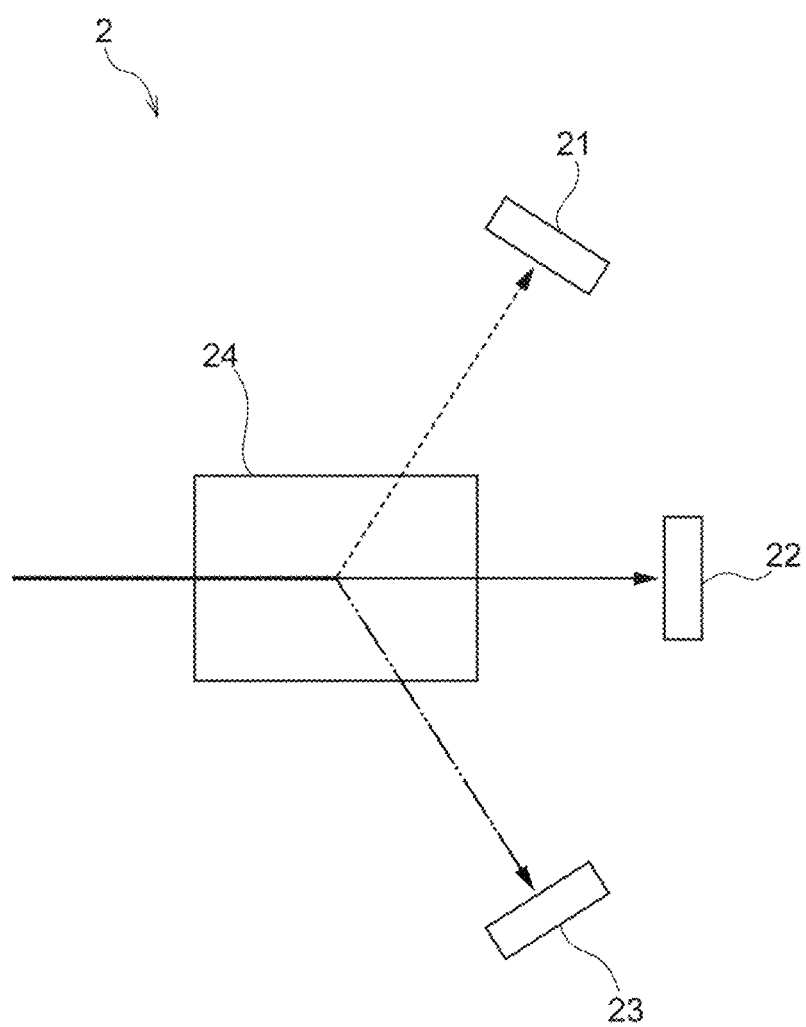
FIG. 9 is a view schematically illustrating the configuration of a solid-state image capture device of a first modification of the first embodiment of the present invention.
Figure 10A:
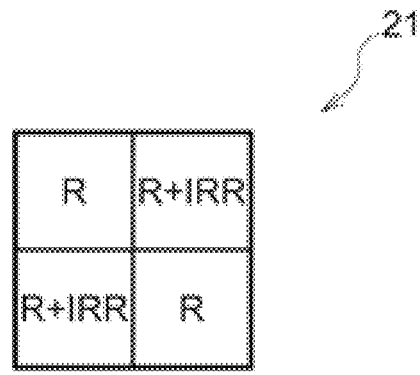
FIGS. 10A to 10C are views illustrating pixel arrangement examples in detection portions 21, 22, and 23, respectively.
Figure 10B:
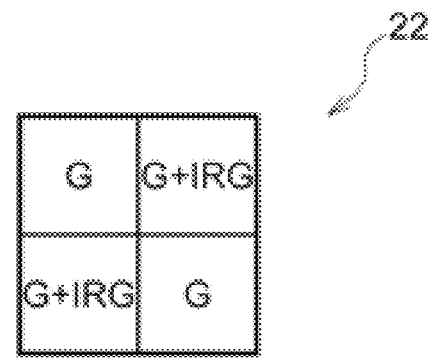
Figure 10C:
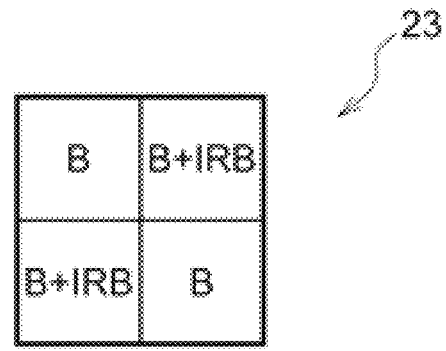

FIG. 9 is a view schematically illustrating the configuration of the solid-state image capture device of this modification. FIGS. 10A to 10C are views illustrating pixel arrangement examples in detection portions 21, 22, and 23, respectively. As illustrated in FIG. 9, in a solid-state image capture device 2 of this modification, the detection portions 21, 22, and 23 each having visible light pixels receiving visible light and near-infrared pixels receiving near-infrared light are provided in a separate solid-state image capture element. The solid-state image capture device 2 is provided with a spectral element 24 spectrally dividing light (visible light, near-infrared light) from a subject for each specific wavelength, and then emitting the spectrally divided light to the detection portions 21, 22, and 23.

[Detection Portions 21 to 23]

The detection portions 21 to 23 of the solid-state image capture device 2 of this modification can be configured to have the pixel arrangements having the repeating units as illustrated in FIGS. 10A to 10C, respectively, for example. In this case, in the first detection portion 21, the red light R and the near-infrared light IRR in correlation with the red light are detected. In the second detection portion 22, the green light G and the near-infrared light IRG in correlation with the green light are detected. In the third detection portion 13, the blue light B and the near-infrared light IRB in correlation with the blue light are detected.

In the solid-state image capture device 2 of this modification, a color filter is not required to be provided in each pixel of the detection portions 21 to 23 because the light spectrally divided for each specific wavelength by the spectral element 24 enters each pixel. The visible light pixels R, G, and B may be provided with an infrared cut filter. The pixel arrangements of the detection portion 21 to 23 are not limited to those illustrated in FIGS. 10A to 10C. The number of the repeating units or the number of the pixels per unit is not particularly limited insofar as the visible light pixel and the near-infrared pixel are disposed adjacent to each other as with the first embodiment described above.

[Spectral Element 24]

As the spectral element 24, a dichroic prism or the like is usable, for example. Light to be detected may be able to be spectrally divided and the type or the characteristic is not particularly limited.

Since the solid-state image capture device of this modification is provided with the solid-state image capture element for each detection portion, the pixel configuration is simplified, so that the manufacturing cost of the solid-state image capture element can be reduced as compared with the configuration in which a plurality of detection portions is provided on the same element illustrated in FIGS. 2 to 5. Moreover, the solid-state image capture device of this modification detects light spectrally divided from one light in the corresponding pixels of the three detection portions, and therefore three kinds of light of different wavelengths can be detected per region and further the density between the pixels of the same wavelength also increases, and thus higher resolution can be secured. The configurations and the effects other than the above in the solid-state image capture device of this modification are the same as those of the first embodiment described above.

Second Embodiment

Figure 11:
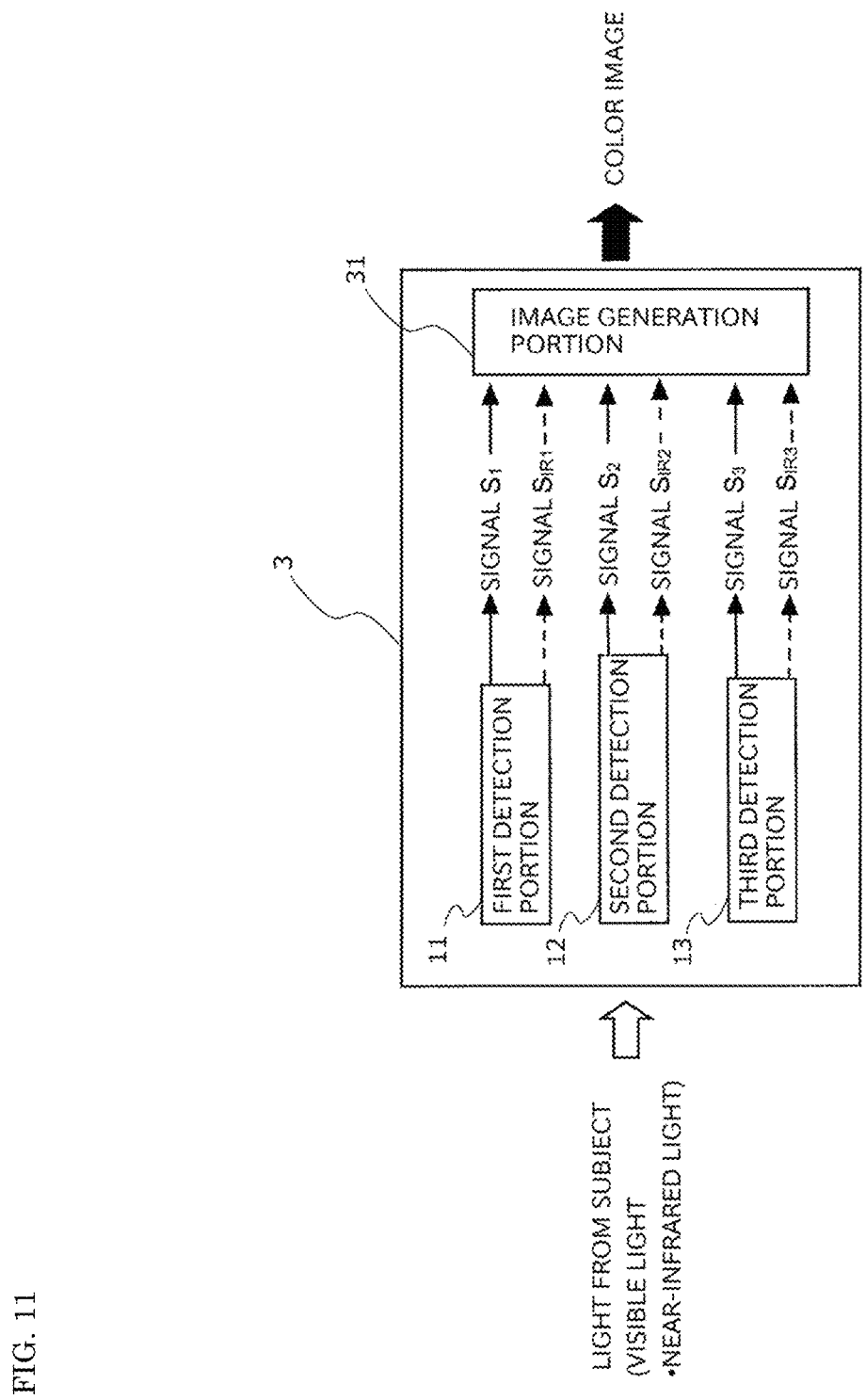
FIG. 11 is a conceptual diagram illustrating a solid-state image capture device of a second embodiment of the present invention.

Next, a solid-state image capture device according to a second embodiment of the present invention is described. FIG. 11 is a conceptual diagram illustrating the solid-state image capture device of this embodiment. In FIG. 11, the same reference numerals as those of the solid-state image capture device illustrated in FIG. 1 are given to the same constituent components as those of the solid-state image capture device illustrated in FIG. 1 and a detailed description thereof is omitted. As illustrated in FIG. 11, a solid-state image capture device 3 of this embodiment is provided with an image generation portion 31 in addition to the first to third detection portions 11, 12, and 13

[Image Generation Portion 31]

Figure 12:
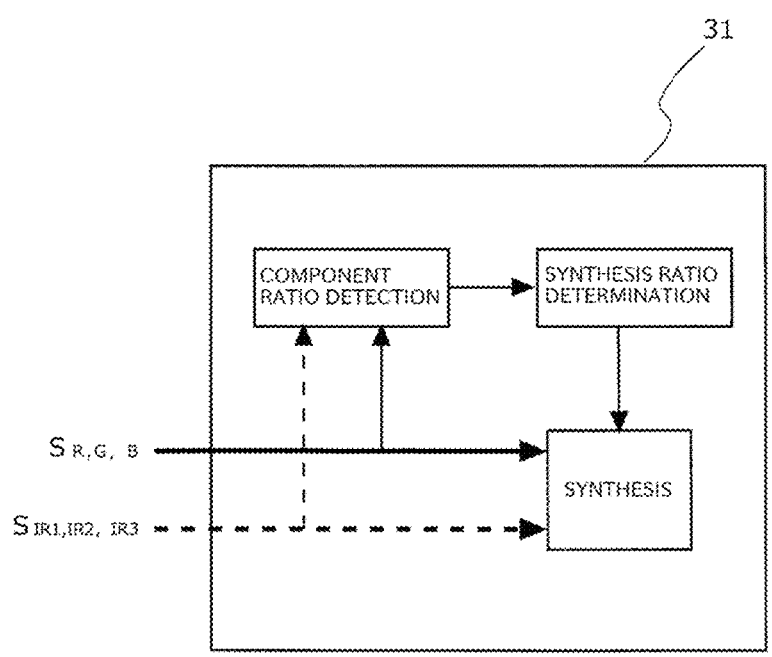
FIG. 12 is a view illustrating a configuration example of an image generation portion 35 illustrated in FIG. 11.

FIG. 12 is a view illustrating a configuration example of the image generation portion 31. The image generation portion 31 generates a color image based on visible light signals $S_1$, $S_2$, and $S_3$ and near-infrared light signals $S_{IR1}$, $S_{IR2}$, and $S_{IR3}$ output from the first to third detection portions 11, 12, and 13, respectively. The image generation portion 35 generates a color image using only the visible light signal $S_1$, $S_2$, and the $S_3$ from the visible light pixels in the case of "Daytime mode" and generates a color image using only the near-infrared signals $S_{IR1}$, $S_{IR2}$, and $S_{IR3}$ from the near-infrared pixels in the case of "Night mode", for example.

Moreover, the image generation portion 31 can also generate a color image using both the visible light signals $S_1$, $S_2$, $S_3$ and the near-infrared signals $S_{IR1}$, $S_{IR2}$, and $S_{IR3}$. When the visible light signals and the near-infrared signals are synthesized, the image generation portion 31 can be configured to determine the synthesis ratio thereof from the ratio of the visible light components and the near-infrared light components as illustrated in FIG. 12, for example.

For example, when one synthesis ratio to all the pixel positions is determined, an integrated value of a fixed pixel range or the like is usable. In that case, a target pixel range is desirably a position in an effective region on which importance is placed in observation. However, when it is difficult to provide a detection portion of each response level to the effective region, a small-sized region dedicated for detection may be provided in an end portion which is the outside of the effective pixel, and the determination may be performed from a detection result of only the region as a simple alternative technique. Moreover, when the synthesis is performed at a different ratio for each pixel region, the response of the adjacent pixels is usable or a result of locally applying filter processing to the response of peripheral pixels is usable. As a pair of two kinds to be compared, not only information of one pair but information of a plurality of pairs may be used and one converted into one typical component ratio information by performing weight average or the like may be utilized.

As the synthesis ratio of the visible light components and the near-infrared components, the calculated component ratio may be applied as it is, for example, or may be intentionally modulated. Examples of modulation methods include, for example, "non-linearly applying only component ratio information", "not giving the near-infrared synthesis ratio unless the near-infrared light component ratio reaches a certain degree or more", "additionally setting the condition also combining other information", "giving the near-infrared synthesis ratio when the incident light quantity determined by an auto-exposure mechanism only based on the visible light components is smaller or when the gain value (for exposure correction) is larger", and the like.

The solid-state image capture device of this embodiment detects visible light of three or more wavelengths and near-infrared light of two or more wavelengths, and therefore can perform photographing in a wide illuminance environment from normal illuminance to darkness (0 lux) and can generate a high-resolution color image. Moreover, the solid-state image capture device of this embodiment can arbitrarily set the synthesis ratio of the visible light components and the near-infrared components, and therefore can perform optimal setting according to the use environment or the like and is excellent in versatility.

The image generation portion may not be built in the solid-state image capture device. Each processing described above can be executed by a program installed in a computer, for example. Moreover, the configurations and the effects other than the above in the solid-state image capture device of this embodiment are the same as those of the first embodiment and the modification thereof described above.

Third Embodiment

Figure 13:
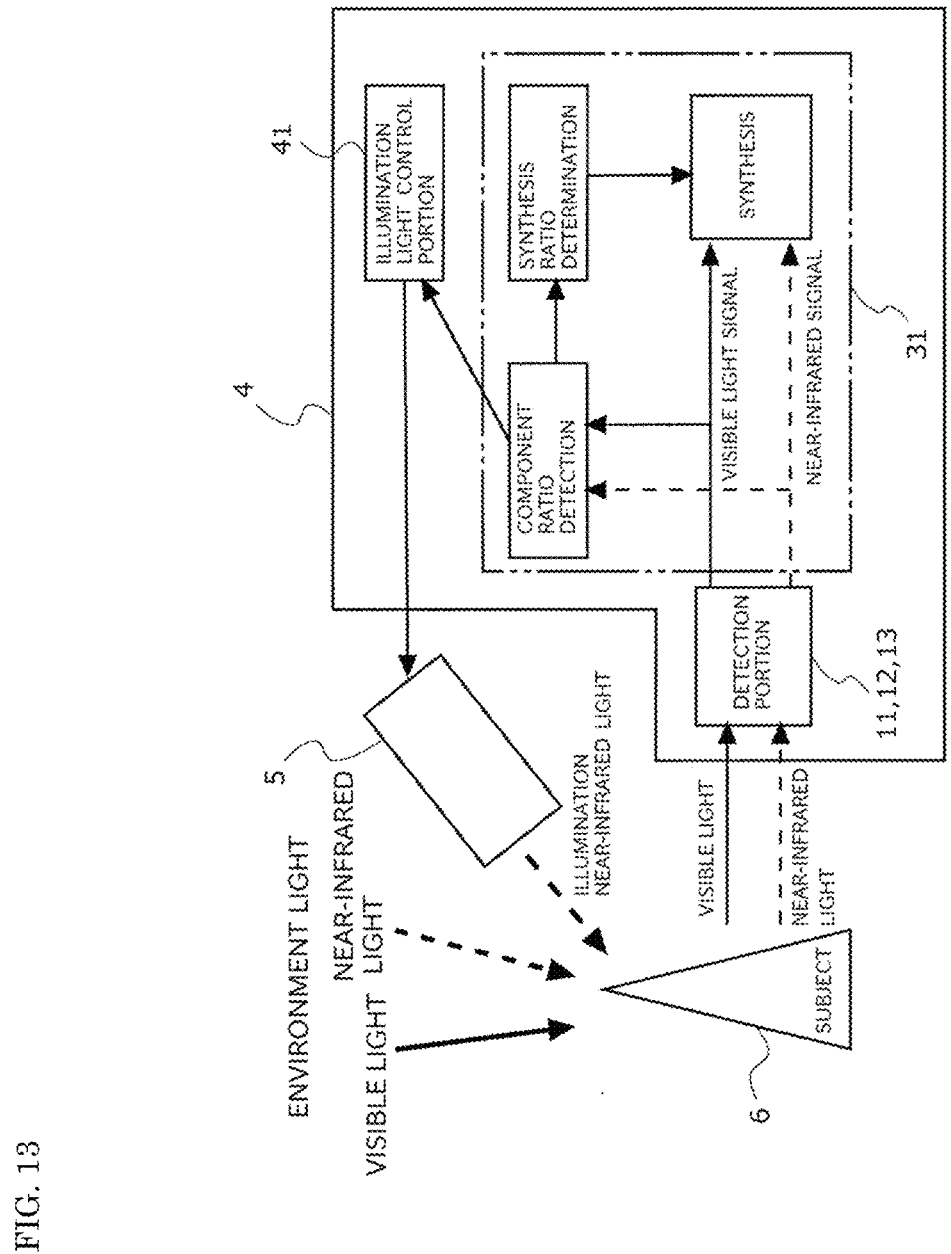
FIG. 13 is a conceptual diagram illustrating an image capture system of a third embodiment of the present invention.

Next, an image capture system according to a third embodiment of the present invention is described. FIG. 13 is a view illustrating a configuration example of the image capture system of this embodiment. As illustrated in FIG. 13, the image capture system of this embodiment is provided with a solid-state image capture device 4 and a light irradiation device 5 irradiating a subject 6 with near-infrared light which is illumination light.

The solid-state image capture device 4 of the image capture system is provided with an illumination light control portion 41 controlling the light quantity of the illumination light (near-infrared light) emitted from the light irradiation device 5 based on detection results of visible light and near-infrared light in the detection portions 11, 12, and 13. In the image capture system, an incident light is preferentially optimized, and then the synthesis ratio can be determined according to the result, for example.

The illumination light control portion 41 emits near-infrared light when it is determined that the signal level of visible light is low in the image generation portion 31 or modulates the illumination light quantity so that the signal level of visible light and the signal level of near-infrared light satisfy a certain standard, for example. When the light irradiation device 5 can operate the light quantity for each of a plurality of kinds of light sources different in wavelength region, the spectral distribution can also be optimized.

The image capture system of this embodiment controls the light irradiation device 5 irradiating a subject with illumination light (near-infrared light) based on the visible light signal and the near-infrared signal output from the detection portions, and therefore can always perform color photographing under the optimal conditions. The image capture system of this embodiment can more appropriately keep a signal in an image capture stage before signal processing as compared with the case of performing photographing without controlling light irradiation, and then performing correction only by signal processing. Therefore, the range where both the color reproducibility and the S/N ratio are achieved and the image quality balance can be kept in both of them spreads, for example. Thus, stably color photographing can be performed in a wide illuminance environment to darkness (0 lux).

The configurations and the effects other than the above in the image capture system of this embodiment are the same as those of the first embodiment, the modification thereof, and the second embodiment described above.

Fourth Embodiment

Figure 14:
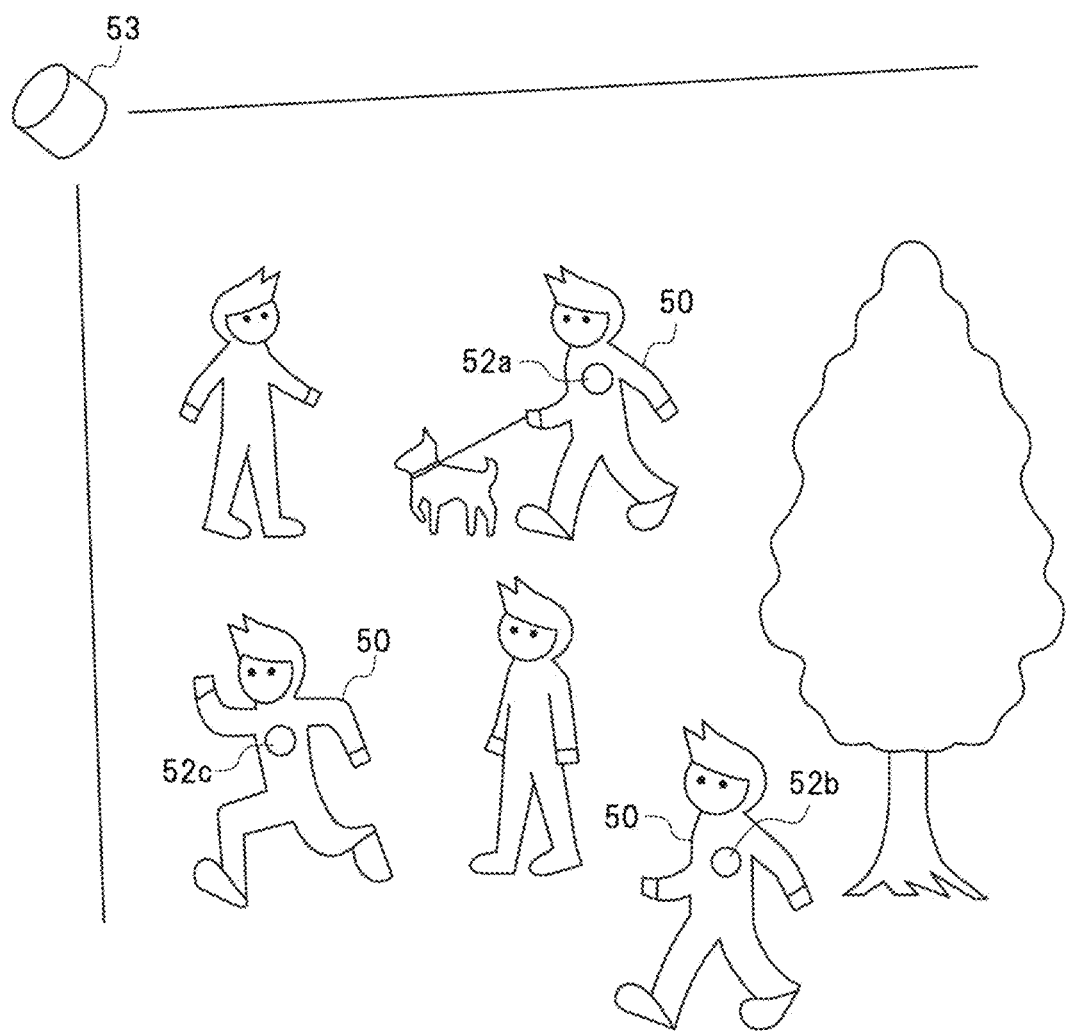
FIG. 14 is a view schematically illustrating the configuration of an object identification system according to a fourth embodiment of the present invention.

Next, an object identification system according to a fourth embodiment of the present invention is described. FIG. 14 is a view schematically illustrating the configuration of the object identification system of this embodiment. As illustrated in FIG. 14, the object identification system of this embodiment has light sources 52a to 52c attached to target objects 50 and emitting near-infrared light of a specific wavelength, a photodetector 53 detecting the near-infrared light emitted from the light sources 52a to 52c, and a data processing device (not illustrated) provided with an object determination portion and an object identification portion.

The object identification system of this embodiment captures a plurality of target objects 50 provided with any one of the light sources 52a to 52c with the photodetector 53, and then records the movement tracks thereof and identifies the target objects 50 based on the wavelength of the near-infrared light emitted from the light sources 52a to 52c. FIG. 14 also illustrates objects (parsons, a tree, and the like) other than the target objects 50.

[Light Sources 52a to 52c]

The light sources 52a to 52c are light emitting elements emitting near-infrared light of wavelengths different from each other and an infrared light emitting diode and the like are usable, for example. In place of the light emitting element, materials reflecting only near-infrared light of a specific wavelength or a paint containing such materials may be used as the light source.

All the light sources 52a to 52c attached to the target objects 50 are not required to have different emission wavelengths. For example, light sources emitting the same wavelength may be attached to a plurality of target objects 50, and then the identification or the detection of the movement track may be performed for each group. Moreover, the emission wavelengths of the light sources are not limited to three types and can be set as appropriate according to the number of the target objects 50 or the number of target object groups. For example, when the target object 50 is one or one group, one kind of light emitting element emitting near-infrared light is usable, for example.

[Photodetector 53]

The photodetector 53 may be one capable of distinguishing and detecting near-infrared light emitted from the light sources 22a to 22c for each wavelength, and then recording the same. For example, the solid-state image capture devices of the first and second embodiments described above are usable. When the light sources 52a, 52b, and 52c are infrared light emitting diodes emitting near-infrared light NIR-R, -G, and -B, respectively, one provided with an image capture element capable of distinguishing and detecting the near-infrared light NIR-R, -G, and -B as with the red light (H), the green light (G), and the blue light (B) in visible light may be used for the photodetector 53.

Although the photodetector 53 may be detectable at least near-infrared light, the photodetector 53 may simultaneously capture a near-infrared image and a visible image, and then record or display the images in a superimposed state, for example. In that case, although both the near-infrared image and the visible image may be captured with one image capture device, both the images may be captured with different devices.

[Data Processing Device]

A data processing device is provided with an object determination portion determining whether the target objects 50 are present in a detection region from the detection results in the photodetector 53 and an object identification portion identifying the target objects 50 from wavelength information of the near-infrared light detected with the photodetector 53. The object identification portion acquires color information given to the target objects from the wavelength of the near-infrared light detected with the photodetector, and then identifies the target objects from the color information, for example.

When an image capture device capturing visible light images in the detection region is further provided, the data processing device may be provided with an image compositing portion adding the color information of the target objects acquired in the object identification portion or arbitrary information correlated with the color information to the visible light image captured with the image capture device. Herein, as the information correlated with the color information beforehand, the name, the feature, and the like of the target objects are mentioned. However, the information is not limited thereto and can be set as appropriate according to the purpose.

The processing result in the data processing device is displayed on a separately provided display device, for example. Specifically, the positions or the movement tracks of the target objects 50 are displayed with predetermined colors or signs, illustrations, and the like indicating the target objects 50 are displayed on still images or moving images photographed by visible light.

The object identification system of this embodiment identifies target objects using a near-infrared light. Therefore, even when there are a large number of objects other than the target objects in such a case of monitoring the movement of persons in the crowd, for example, the object identification system can easily and surely specify the presence or absence or the positions of the target objects and acquire the movement tracks thereof. Moreover, the near-infrared light used in the object identification system of this embodiment is invisible to human beings, and therefore the object identification system can be utilized without giving uncomfortable feeling even when used for persons.

Fifth Embodiment

Next, solid-state image capture elements according to a fifth embodiment of the present invention are described. FIG. 15 and FIG. 16 are views illustrating pixel arrangement examples of the solid-state image capture elements of this embodiment. For the solid-state image capture device of the present invention, the solid-state image capture elements of the pixel arrangements having repeating units illustrated in FIG. 15 and FIG. 16 are also usable. By densely disposing the pixels detecting the green light G and the near-infrared light IRG in correlation with the green light as with the solid-state image capture elements illustrated in FIG. 15 and FIG. 16, the luminance resolution can be increased.

The invention claimed is:

1. A solid-state image capture device comprising:
    a first detection portion in which a first visible light pixel receiving first visible light and a first near-infrared pixel receiving first near-infrared light are provided adjacent to each other;
    a second detection portion in which a second visible light pixel receiving second visible light different in wavelength from the first visible light and a second near-infrared pixel receiving second near-infrared light are provided adjacent to each other;
    a third detection portion in which a third visible light pixel receiving third visible light different in wavelength from the first visible light and the second visible light and a third near-infrared pixel receiving third near-infrared light are provided adjacent to each other; and
    the first detection portion, the second detection portion, and the third detection portion are provided on a same element.

2. The solid-state image capture device according to claim 1, wherein
    the first near-infrared pixel also receives the first visible light,
    the second near-infrared pixel also receives the second visible light, and
    the third near-infrared pixel also receives the third visible light.

3. The solid-state image capture device according to claim 1, wherein
    the first visible light, the second visible light, and the third visible light are red light, green light, and blue light, respectively.

4. The solid-state image capture device according to claim 1, wherein
    the first near-infrared light is light in a near-infrared region in correlation with the first visible light,
    the second near-infrared light is light in the near-infrared region in correlation with the second visible light, and
    the third near-infrared light is light in the near-infrared region in correlation with the third visible light.

5. The solid-state image capture device according to claim 1, which receives two kinds or three kinds of near-infrared light of different wavelengths by the first to third near-infrared pixels.

6. The solid-state image capture device according to claim 1, wherein
    the second near-infrared pixel and/or the third near-infrared pixel receive/receives light in bands including two or more among light in a near-infrared region in correlation with the first visible light, light in the near-infrared region in correlation with the second visible light, and light in the near-infrared region in correlation with the third visible light.

7. The solid-state image capture device according to claim 1, comprising:
    an image generation portion generating a color image using signals acquired by the first to third detection portions.

8. The solid-state image capture device according to claim 7, wherein
    the image generation portion composites visible light components detected in the first to third visible light pixels and near-infrared light components detected in the first to third near-infrared pixels at an arbitrary ratio to generate a color image.

9. An image capture system comprising:
    the solid-state image capture device according to claim 1; and
    a light irradiation device irradiating a subject with near-infrared light.

10. The image capture system according to claim 9, wherein the solid-state image capture device is provided with an illumination light control portion controlling a light quantity of the near-infrared light emitted from the light irradiation device based on detection results of visible light and near-infrared light in each detection portion.

11. An object identification system comprising:
a first light source attached to a first target object and emitting first near-infrared light of a first specific wavelength;
a second light source attached to a second target object and emitting second near-infrared light of a second specific wavelength that is different from the first specific wavelength;
a photodetector detecting the first and/or the second near-infrared light emitted from the first and/or the second light source simultaneously; and
a data processing device provided with an object determination portion determining whether the first and/or the second target objects are present in a detection region from a detection result in the photodetector and an object identification portion identifying the first and/or the second target objects are from wavelength information of the first and/or the second near-infrared light detected with the photodetector.

12. The object identification system according to claim 11, wherein
the photodetector is the solid-state image capture device according to claim 1, and
the object identification portion acquires color information given to each of the first and/or the second target objects from a wavelength of the first and/or the second near-infrared light detected with the photodetector and identifies the first and/or the second target objects from the color information.

13. The object identification system according to claim 12 further comprising:
an image capture device capturing a visible light image in each of first and/or the second target objects, wherein
the data processing device is provided with an image compositing portion adding the color information of each of first and/or the second target objects acquired in the object identification portion or arbitrary information correlated with the color information to the visible light image captured with the image capture device.

14. An image capture system comprising:
the solid-state image capture device according to claim 7; and
a light irradiation device irradiating a subject with near-infrared light.

15. The image capture system according to claim 14, wherein
the image generation portion composites visible light components detected in the first to third visible light pixels and near-infrared light components detected in the first to third near-infrared pixels at an arbitrary ratio to generate a color image.

16. The image capture system according to claim 15, wherein
the solid-state image capture device is provided with an illumination light control portion controlling a light quantity of the near-infrared light emitted from the light irradiation device based on detection results of visible light and near-infrared light in each detection portion.

17. A solid-state image capture device comprising:
a first detection portion in which a first visible light pixel receiving first visible light and a first near-infrared pixel receiving first near-infrared light are adjacent to each other;
a second detection portion in which a second visible light pixel receiving second visible light different in wavelength from the first visible light and a second near-infrared pixel receiving second near-infrared light different in wavelength from the first near-infrared light are adjacent to each other;
a third detection portion in which a third visible light pixel receiving third visible light different in wavelength from the first visible light and the second visible light and a third near-infrared pixel receiving third near-infrared light different in wavelength from the first near-infrared light and the second near-infrared light are adjacent to each other; and
the first detection portion, the second detection portion, and the third detection portion are on a same element and each of the first detection portion, the second detection portion, and the third detection portion is configured to output a visible light signal and a near-infrared signal.

18. The solid-state image capture device according to claim 17, wherein the first detection portion is configured to detect first visible light at the first visible light pixel and first near-infrared light at the first near-infrared light pixel simultaneously, the second detection portion is configured to detect second visible light at the second visible light pixel and second near-infrared light at the second near-infrared light pixel simultaneously, and the third detection portion is configured to detect third visible light at the third visible light pixel and third near-infrared light at the third near-infrared light pixel simultaneously.

19. The solid-state image capture device according to claim 1, wherein the first visible light pixel and the first near-infrared pixel immediately adjacent to each other; the second visible light pixel and the second near-infrared pixel immediately adjacent to each other; and the third visible light pixel and the third near-infrared pixel immediately adjacent to each other.

* * * * *